United States Patent [19]

Reynard et al.

[11] 4,006,125

[45] Feb. 1, 1977

[54] CURABLE POLYPHOSPHAZENES

[75] Inventors: Kennard A. Reynard, Mentor; Arthur H. Gerber, University Heights, both of Ohio

[73] Assignee: Horizons Incorporated a division of Horizons Research Incorporated, Cleveland, Ohio

[22] Filed: July 21, 1975

[21] Appl. No.: 597,748

Related U.S. Application Data

[63] Continuation of Ser. No. 504,740, Sept. 10, 1974, abandoned.

[52] U.S. Cl. .................. 260/77.5 AQ; 260/2 P; 260/47 CB; 260/77.5 AR
[51] Int. Cl.$^2$ .................................. C08G 18/00
[58] Field of Search ........... 260/77.5 AQ, 77.5 AR, 260/47 CB, 2 P

[56] References Cited

UNITED STATES PATENTS 3,370,020   2/1968   Allcock et al. .................. 260/2
3,627,841   12/1971   Kober et al. .................... 260/77.5

OTHER PUBLICATIONS

Buist et al.; Advances in Polyurethane Technology; Maclaren and Sons Ltd.; 1968; pp. 9, 10, 14–16, 28.

Primary Examiner—Lewis T. Jacobs
Attorney, Agent, or Firm—Lawrence I. Field

[57] ABSTRACT

Soluble polyphosphazenes which can be cured at moderate temperatures by the action of moisture are obtained when polyphosphazenes containing small amounts of OH functionality in the side chains are reacted with an excess of polyisocyanate in the presence of a suitable catalyst.

8 Claims, No Drawings

CURABLE POLYPHOSPHAZENES

This application is a continuation of application Ser. No. 504,740 filed Sept. 10, 1974 and now abandoned.

This invention relates to polyphosphazene polymers which can be cured at moderate temperatures, by the action of moisture. More particularly it relates to the modification of polyphosphazene polymers of the type described in U.S. Patent Application Ser. No. 303,159 filed Feb. 4, 1974 and its continuation Ser. No. 495,464 issued Apr. 6, 1976 as U.S. Pat. No. 3,948,820 by means of an excess of polyfunctional isocyanates.

Polyphosphazenes have recently been described in the Scientific American of March 1974 and in "Phosphorus-Nitrogen Compounds" by Allcock, published (1972) by Academic Press, New York, New York and in Chemical Reviews 72 pages 315 et. seq. (1972).

Polyphosphazenes have been prepared consisting of essentially linear chains of alternating N and P atoms, to which various groups may be attached. When only a single kind of side chain is present these have been designated homopolymers as in U.S. Pat. No. 3,370,020 issued Feb. 20, 1968; when two different types of side chains are attached to the P atoms, the polyphosphazenes have been designated copolymers as in U.S. Pat. No. 3,515,688 issued June 2, 1970 and when three distinct kinds of side chains are attached to the P atoms the polymers have been designated terpolymers as in U.S. Pat. No. 3,702,833 which issued Nov. 14, 1972.

The present invention is applicable to polyphosphazenes in which two or more different groups are attached to the P atoms and in which at least some groups contain OH functionality.

Briefly the invention comprises reacting such polyphosphazenes with an excess of polyfunctional isocyanate producing a soluble product which "cures" at moderate temperatures in the presence of moisture. The ratio of NCO/OH essential to achieve this result depends on the reactivity of the isocyanate and is usually preferably >1.5. The resulting isocyanateterminated prepolymers react readily with moisture present in the air at room temperatures and the –NCO group is converted to an

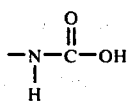

group which decarboxylates to an active –NH$_2$ group suitable for crosslinking.

The uncrosslinked products are particularly useful in coatings, which may then be crosslinked in situ.

The invention will be more fully understood from the description which follows in which preferred embodiments are set forth.

Polyphosphazenes to which the present invention is particularly applicable are the substantially linear polyphosphazenes described in United States Patent Application Ser. No. 303,159 filed Nov. 2, 1972 in which the skeletal chains comprise randomly repeating units represented by the general formulae:

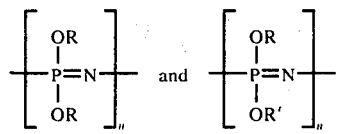

Wherein each R is a monovalent radical selected from the group consisting of alkyl, substituted alkyl, fluoroalkyl, aryl, substituted aryl, and arylalkyl and not every R in the polyphosphazene is required to be identical to every other R; and each R' is a monovalent aliphatic or aromatic group or substituted alkyl or aryl group containing OH functionality and is represented by the formula

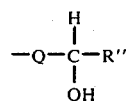

wherein Q is either $(CH_2)_t$ or $-C_6H_4X(CH_2)_n$, the $X(CH_2)_m$ group being meta or para, $n$ is an integer from 1 to 6 and $m$ is an integer from 1 to 3, X is O (oxygen) CH$_2$, R'' is H or a lower alkyl group with up to 4 carbon atoms; and the ratio of R':R is between 0.5 to 99.5 and 35 to 65, and $n$ is an integer from 10 to about 50,000.

The preparation of the polymers to which this invention is applicable is described in the above noted Ser. No. 303,159, the disclosure of which is intended to be incorporated by reference.

In one process for the preparation of the polymers of this invention poly(dichlorophosphazene) is dissolved in a suitable solvent such as benzene, toluene, xylene, chlorobenzene, o-dichlorobenzene, tetrahydrofuran or mixtures thereof. This polymer solution is gradually added to a well stirred solution or suspension of alkoxide salt(s), e.g., as described in U.S. Pat. No. 3,515,688 If preferred the salt(s) may be added to the solution of poly(dichlorophosphazene). Sodium alkoxides are normally employed, but lithium or potassium salts are also suitable. The salts should be present in excess. The total mole percent of salts is preferably in the range of 105 to 200 percent based on equivalents of chlorine originally present in the poly(dichlorophosphazene). The alkali salts derived from such alcohols or diols as trifluoroethanol, 2,2,3,3,3-pentafluoropropanol, 2,2,3,3,4,4,4-heptafluorobutanol, 2,2,3,3-tetrafluoropropanol, 2,2,3,3,4,4,5,5-octafluoropentanol, 2,2,3,3,4,4,5,5,6,6,7,7-dodecafluoroheptanol, 2,2,3,4,4,4-hexafluorobutanol, 1,1,1,3,3,3-hexafluoroisopropanol, 2,2,3,3,4,4,5,5,6,6,7,7,8,8,8-pentadecafluorooctanol, 1,2-propanediol, 1,3-butanediol, 1,5-hexanediol, 1,2-hexanediol, 2-(m-hydroxyphenoxy)-ethanol, ethylene glycol, 1,3-propanediol, and 1,4-butanediol, methanol, n-butanol, n-octanol, 2-methoxyethanol, 2-(n-butoxy)-ethanol, phenol, 3-or 4-cresol, 3- or 4-chlorophenol, 3- or 4-phenylphenol, 4-phenoxyphenol, and benzyl alcohol are all suitable. Other alcohols that can be used will be obvious to those skilled in the art.

Polyisocyanates and polyanhydrides which have been found to be suitable for reaction with the polyphosphazenes include the following:

A. diisocyanates 1-chloro-2,4-phenylene diisocyanate
m-phenylene diisocyanate
p-phenylene diisocyanate
4,4'-diphenylmethane diisocyanate
2,4-toluene diisocyanate
3,3'-dimethyl-4,4'-diphenylmethane diisocyanate
2,2',5,5'-tetramethyl-4,4'-biphenylene diisocyanate
2,4-/2,6-toluene diisocyanate (80/20)
3,3'-dimethoxy-4,4'-biphenylene diisocyanate
3,3'-dichlorobiphenylene diisocyanate
α,α'-xylene diisocyanate
vinylene diisocyanate
polymethylene polyphenylisocyanate
dimeryl diisocyanate
trimethylhexamethylene diisocyanate
isophorone diisocyanate
p-isocyanatobenzenesulfonylisocyanate B. dianhydrides
pyromellitic dianhydride
3,3',4,4'-benzophenone tetracarboxylic dianhydride
bis(3,4-dicarboxyphenyl)ether dianhydride
2,2-bis(3,4-biscarboxyphenyl)propane dianhydride
1,2,4,5-cyclohexane tetracarboxylic dianhydride
2,2-bis(3',4'-dicarboxyphenyl)hexafluoropropane dianhydride
bis(3,4-dicarboxyphenoxyphenyl)sulfone dianhydride
1,3-bis(3,4-dicarboxyphenyl)hexafluoropropane dianhydride
3,4-dicarboxy-1,2,3,4-tetrahydro-1-naphthalenesuccinic dianhydride The above list is for purposes of illustration only and is not intended to be all inclusive. Other polyisocyanate or anhydride crosslinking reagents may be used as curing agents.

The applicable reaction with a diisocyanate may be represented as follows:

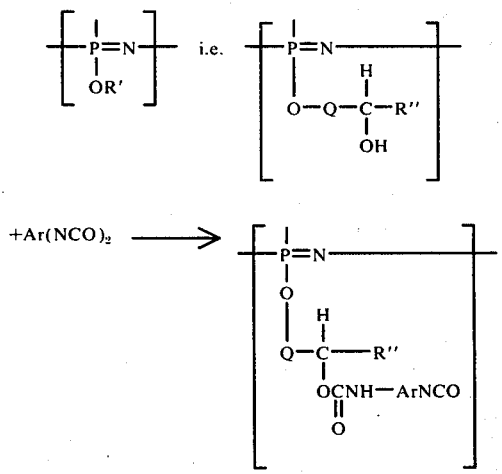

wherein R', Q and R'' are as previously defined, wherein Ar represents a divalent aromatic radical and in which R' is a group with OH functionality. In the presence of a suitable catalyst, the isocyanate presumably reacts with the OH group, e.g. as shown above, to produce a polymer with attached isocyanate groups and in the presence of atmospheric moisture the polymer chains then crosslink. Suitable catalysts include the salts and tertiary amines such as those used in polyurethane technology.

One polyphosphazene representative of terpolymers to which the present invention is applicable may be described by the following idealized formula:

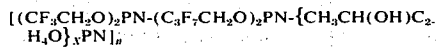

terpolymer. In reality, this polymer is a random mixture in which similar or dissimilar groups may be attached to a given phosphorus atom. This terpolymer is readily soluble in Freon TA or mixtures of Freon TA with acetone. This polymer was prepared as described in Example 1 which follows. A representative copolymer of this invention would be where one of the $CF_3CH_2O-$ or $C_3F_7CH_2O-$ groups above is not present.

Obviously the structure and molecular weight of the polymer will influence its solubility. It is preferred that the solvent or solvents employed are such that the phosphazene co-or terpolymer, isocyanate or anhydride reagent, and catalyst, if any, are compatible. Polymer containing large amounts of $CF_3(CF_2)_{n=2-10}$ groups will generally require increasing amounts of fluorinated solvent(s) for solubilization when molecular weights are equal. Lower molecular weights facilitate the degree of solubility in solvents for the polymers.

The following examples are illustrative of the present invention but are not intended to limit the same in any way.

EXAMPLE 1

Preparation of Low Molecular Weight Terpolymer

The $[Cl_2PN]_n$ polymer (35.8 g, 0.309 mole) with intrinsic viscosity of 0.16 dl/g (benzene, 30° C) was dissolved in 250 ml of dry benzene and was added over 1 hour to an alkoxide mixture prepared in 500 ml dry tetrahydrofuran from Na(14.6 g, 0.635 mole), $CF_3CH_2OH$ (24.7 g, 0.247 mole), n-$C_3F_7CH_2OH$ (49.4 g, 0.247 mole), and $CH_3CH(OH)C_2H_4OH$ (22.2 g, 0.247 mole). The reaction was exothermic (55°–60° C) and the mixture was heated at 66° C for an additional 16 hours. The cooled mixture (23° C) was acidified with 25 g of 10% HCl. Liquids were decanted from the white solids and combined with a 200 ml tetrahydrofuran rinse of the solids. Evaporation afforded, after washing, an opaque, yellow-brown liquid (45.7 g, 46% yield) which was moderately viscous. The solids were washed twice with distilled water and then dissolved in 400 ml of Freon TA for additional washing. Precipitation with 2 volumes of a-heptane, followed by drying, gave a gray rubbery solid (24.7 g, 25% yield) with slow cold flow.

The liquid fraction was insoluble in ASTM Fuel A, but partly soluble in ASTM Fuel C, benzene, chloroform, methanol and n-heptane. The calculated mole % —OH of 27 from elemental analysis corresponds to an —OH content and functionality of 1.71 meq/g and 1.76, respectively. The liquid and solid fractions were characterized by intrinsic viscisity, molecular weight and elemental analysis and the data are presented in Table I.

Table I

Characterization of $[(CF_3CH_2O)_2PN-(C_3F_7CH_2O)_2PN-CH_3CH(OH)C_2H_4O\ _xPN]_n$ Terpolymers 30° C

| Ex. | Fractions, Physical State | Yield (%) | [n]Freon TF (dl/g) | Mole % [a] OH | $M_{VPO}$ [b] | Analysis (%) C | H | N |
|---|---|---|---|---|---|---|---|---|
| 1. | rubbery solid | 25 | 0.3 | 15.0 | 2430 [c] | 23.3 | 2.2 | 5.1 |
|  | viscous liquid | 46 | <0.03 | 27.0 | 1030 | 25.2 | 2.4 | 5.0 |
| 2. | soft rubber | 29 | 0.35 | 8.8 | 3848 [d] | 22.3 | 1.6 | — |
|  | oil | 57 | — | 28.9 | 840 | 25.5 | 2.1 | — |
| 3. | taffy like solid | 28 | 0.06 [e] | 38.2 | 2260 | 27.3 | 3.1 | 4.7 |
| 4. | rubbery solid | 42 | 0.11 | 17.0 | — | 23.6 | 2.1 | 5.1 |
|  | grease | 29 | 0.03 | 32.0 | 2080 | 26.2 | 2.8 | 5.4 |
| 5. | rubbery solid | 22 | 0.21 | 18.3 | 38000 | 23.8 | 2.2 | — |
| 6. | rubber | 25 | 0.21 | 21.9 | 11200 | 24.4 | 2.3 | — |
|  | viscous liquid | 36 | 0.04 | 33.3 | 1660 | 26.4 | 2.5 | — |
| 7. | rubbery solid | 39 | 0.33 | 11.4 | — | 22.7 | 1.7 | 4.6 |

[a] Calculated from elemental analysis
[b] Number average molecular weight by vapor phase osmometry in acetone
[c] 5530 in Freon TF $(CCl_2FCClF_2)$
[d] Freon TF used as solvent
[e] Freon TA as solvent

EXAMPLE 2

Preparation of a High Molecular Weight Terpolymer

An alkoxide mixture was prepared by the reaction of $CF_3CH_2OH$ (350 g, 3.50 moles), $n-C_3F_7CH_2OH$ (700 g, 3.50 moles), and $CH_3CH(OH)C_2H_4OH$ (180 g, 2.00 moles) with sodium (189.8 g, 8.25 moles) in 7.5 liters of dry tetrahydrofuran (THF). The alkoxide mixture was heated overnight at 48° C and the $[Cl_2PN]_n$ polymer/cyclic mixture (435 g, 7.50 equivs.), was added as a benzene solution (2.7 liters) over 3 hours to the refluxing alkoxide solution. After addition was complete the reaction mixture was stirred at reflux (68° C) for 16 hours. The mixture at room temperature was acidified (pH 2) with 10% HCl and the clear yellow liquid decanted and combined with a 2 liter THF rinse of the solids. The solids were washed with 15 liters of water, dissolved in 3 liters of Freon TA, and washed exhaustively with water until the aqeuous layer was free of chloride ion. The Freon TA solution was evaporated and dried to give a soft rubbery product (366 g, 29.4% yield). Data for the characterization of this whitish elastomer is presented in Table I. The calculated -OH content and functionality was 0.53 meq/g and 2.04, respectively.

The original decanted reaction liquor and THF rinse were evaporated, washed well with distilled water and dried to afford red-brown oil (659 g, 57% yield) which is characterized in Table I.

EXAMPLES 3-7

The $[(CF_3CH_2O)_2PN-(C_3F_7CH_2O)_2PN-\{CH_3CH(OH)C_2H_4O\}_xPN]_n$ terpolymers of Example 3-7 were prepared according to the procedures of Examples 1 and 2 and are characterized in Table I.

EXAMPLE 8

Room Temperature Solution Cure Studies of $[(CF_3CH_2O)_2PN-(C_3F_7CH_2O)_2PN-\{CH_3CH(OH)C_2H_4O\}_xPN]_n$ Terpolymers Curing studies were carried out in closed vials by addition of polyisocyanate to the terpolymer solution (2-10 ml of tetrahydrofuran, Freon TA, or mixtures thereof) followed by addition of catalyst (dibutyl tin diacetate) DBTDA. After shaking well, samples were observed at regular time intervals. Three levels of polyisocyanate [50, 100, 150 mole% NCO relative to the calculated (from elemental analysis) mole % —OH in terpolymer] were employed. Results of these studies are shown in Table II.

Table II

Attempted Room Temperature Solution Cures of $[(CF_3CH_2O)_2PN-(C_3F_7CH_2O)_2PN-\ CH_3CH(OH)C_2H_4O\ _xPN]_n$ Terpolymers

| Terpolymer Example | g | Solvent | Iso- [a] cyanate | g | DBTA Catalyst (μl) | Time Hrs. | Days | Remarks |
|---|---|---|---|---|---|---|---|---|
| 1. | 0.53 |  | PAPI | 0.06 | 20 | 1 |  | gel |
| (rubbery | 0.53 | THF+ | PAPI | 0.10 | 20 | 1 |  | opaque [b] |
| solid) | 0.53 | Freon TA | PAPI | 0.13 | 20 | 1 |  | opaque [b] |
| 7. | 0.72 | THF+ | PAPI | 0.018 | 15 |  | 1-3 | loose gel |
|  | 0.72 | Freon TA | PAPI | 0.035 | 15 |  | 1-3 | gel |
|  | 0.72 |  | PAPI | 0.07 | 15 |  | 1-3 | tight gel |
| 3. | 0.51 | THF | PAPI | 0.14 | 14 |  | 8 | gel |
|  | 0.21 | THF | PAPI | 0.14 | 14 |  | 8 | gel |
|  | 0.13 | THF | PAPI | 0.14 | 14 |  | 8 | gel |
| 4. (grease) | 0.80 | THF | PAPI | 0.06 | 20 |  | 1 | precipitation of solid |
|  | 0.80 | THF | PAPI | 0.13 | 20 |  | 1 | precipitation of solid |
|  | 0.80 | THF | PAPI | 0.20 | 20 |  | 1 | precipit- |
| liquid of |  |  |  |  |  |  |  | solid |
|  | 0.80 | THF | PAPI | 0.14 | 15 |  | 22 | gel |
| 5. | 0.88 | THF+ | PAPI | 0.07 | 15 |  | >3<16 | gel |
|  | 0.88 | Freon TA | PAPI | 0.14 | 15 |  | >3<16 | gel |

Table II-continued

Attempted Room Temperature Solution Cures of
[(CF$_3$CH$_2$O)$_2$PN-(C$_3$F$_7$CH$_2$O)$_2$PN- CH$_3$CH(OH)C$_2$H$_4$O $_x$PN]$_n$
Terpolymers

| Terpolymer Example | g | Solvent | Iso-[a] cyanate | g | DBTA Catalyst (µl) | Time Hrs. | Time Days | Remarks |
|---|---|---|---|---|---|---|---|---|
|  | 0.88 |  | PAPI | 0.21 | 15 |  | >3<16 | opaque[b] solution |
| 6. (rubber) | 0.72 | THF+ Freon TA | PAPI | 0.14 | 15 |  | 20 24 | soluble loose gel |
| 6. (viscous liquid) | 0.45 | THF+ Freon TA | PAPI | 0.14 | 15 |  | 20 | loose gel |

[a] PAPI = polymethylene polyphenylisocyanate (Upjohn Co.)
[b] Cured when film is cast from open dish

EXAMPLE 9

Cured Film Studies

Solutions of the [(CF$_3$CH$_2$O)$_2$PN—(C$_3$F$_7$CH$_2$O)$_2$-PN—{CH$_3$CH(OH)C$_2$H$_4$O}$_x$PN]$_n$ terpolymer (soft rubber of Example 2) (1.06 g, 0.56 meq) were formulated as shown in Table III and DBTDA catalyst (0.006 g) was added.

Table III

| Sample | Preparation of Cured Films | | | |
|---|---|---|---|---|
|  | PAPI (g) | BTDI[a] (g) | Freon TA (g) | Acetone (g) |
| 1. | 0.188 (1.4 meq) | — | 4.4 | 1.8 |
| 2. | 0.234 (1.75 meq) | — | 4.4 | 1.8 |
| 3. | — | 0.148 (1.12 meq) | 6.8 | — |

[a] BTDI = 3,3'-dimethyldiphenyldiisocyanate

Films from each of the three samples were cast, allowed to air dry, vacuum dried(1 hour), and stirred with 10 ml of Freon TA for 2.5 days. The residue obtained from the Freon TA solution gave the % extractable shown in Table IV.

Table IV

| Sample | Extraction of Cured Films | | | |
|---|---|---|---|---|
|  | Film Thickness (mils) | Air Drying Time (hrs) | % Extractables[a] | Appearance of Extractables |
| 1. | 7.8 – 8.2 | 24 | 6.3 | grease |
| 2. | 6.5 – 7.5 | 24 | 7.6 | grease |
| 3. | 3.5 – 5.5 | 5 | 15.6 | dry solid |

Table IV-continued

| Sample | Extraction of Cured Films | | | |
|---|---|---|---|---|
|  | Film Thickness (mils) | Air Drying Time (hrs) | % Extractables[a] | Appearance of Extractables |
|  |  | 72 | 6.9 | grease |

[a] from films of 0.084 – 0.175 g.

The unextracted air cured films (ca. 0.15 g) 2 and 3 were placed in vials containing 15 ml distilled water, heated 18 hours at 80° C and vacuum dried (3 hours). The films which showed no obvious change in texture or elasticity were extracted 2 1/2 days with 10 ml Freon TA. Both samples showed 6.5 ± 0.2% extractables in the form of a grease.

EXAMPLE 10

Dip Coating and Cure on a Circuit Board Substrate

A 12.5% coating solution in dry Freon TA was prepared from [(CF$_3$CH$_2$O)$_2$PN-(C$_3$F$_7$CH$_2$O)$_2$PN-{CH$_3$CH(OH)C$_2$H$_4$O}$_x$PN]$_n$ terpolymer (10 parts) (soft rubber of Example 2), 3,3'-dimethyldiphenyldiisocyanate (1.4 parts) and dibutyl tin diacetate catalyst (0.18 parts). Pieces of clean dry epoxy circuit board were dipped twice, and slowly allowed to dry over a period of one day. Film (1–3 mls) adhesion of the coated pieces was made by cross-hatching with a razor blade, firmly pressing cellophane tape over the hatch marks, and pulling the tape quickly. All samples showed no adhesive film failure.

EXAMPLE 11–14

In a manner similar to that described in Examples 1 and 2, the following copolymers and terpolymers of Example 11–14 were prepared. These polymers were crosslinked with polyisocyanates or dianhydrides as indicated.

| Ex. | Alcohols (mole %) Employed | 30° C [n](dl/g) Tetrahydrofuran | Crosslinking Agent | °C |
|---|---|---|---|---|
| 11. | CF$_3$CH$_2$OH (85) CH$_3$CH(OH)C$_2$H$_4$OH (15) | 1.1 | 4,4'-diphenylmethane diisocyanate | 25 |
| 12. | CF$_3$CH$_2$OH (40) HCF$_2$C$_3$F$_6$CH$_2$OH (40) CH$_3$CH(OH)CH$_2$OH (20) | 1.5 | 3,3'-dimethyl-4,4'-diphenyl diisocyanate | 25 |
| 13.$^a$ | CF$_3$CH$_2$OH (40) C$_6$H$_5$OH (40) CH$_3$CH(OH)C$_2$H$_4$OH (20) | 0.8 | 2,2-bis(3', 4'-dicarboxyphenyl) hexafluoropropane dianhydride | 120 |
| 14. | n-C$_3$F$_7$CH$_2$OH (85) HOCH$_2$CH$_2$OH (15) | 0.4 (Freon E-2) | p-isocyanatobenzene-sulfonyl chloride | 80 | a Bis(2-methoxyethyl)ether as solvent, and final reaction temperature of 100° C.

We claim:
1. A curable linear polyphosphazene composition which can be crosslinked at room temperature and above in the presence of moisture comprising a polyphosphazene which consists of randomly repeating substituents attached to the phosphorus atoms of a —P=N— backbone, said substituents being represented by the general formulae —OR and OR', wherein each OR represents a monovalent member selected from the group consisting of alkoxy, polyfluoroalkoxy, aryloxy, arylalkoxy, and substituted derivatives thereof and all of the OR groups are not required to be identical, and each OR' represents the group

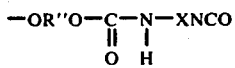

wherein R" is a divalent alkylene or arylalkylene group and all the R" groups are not required to be the same and X is a divalent arylene or alkylene group;
  the degree of polymerization of said polyphosphazene being from 10 to about 50,000.

2. The composition of claim 1 including in addition a catalyst present in an amount to effect curing or crosslinking of said composition.

3. The composition of claim 2 wherein the catalyst is a dialkyl tin carboxylate or a tertiary amine.

4. The composition of claim 1 wherein the -OR groups attached to the phosphorus atoms include at least one polyfluoroalkoxy group selected from the group consisting of CF$_3$CH$_2$O; CF$_3$(C$_2$F$_4$)CH$_2$O; HCF$_2$CF$_2$CF$_2$CH$_2$O; and HCF$_2$(C$_3$F$_6$)CH$_2$O.

5. The composition of claim 1 wherein X is selected from the group consisting of 2,5-tolyl and

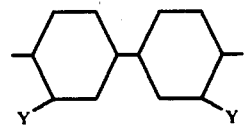

wherein the Y's are selected from the group consisting of H, halogen, alkyl and alkoxy.

6. The composition of claim 1 cured with moisture.
7. The composition of claim 2 cured with moisture.
8. A process which comprises preparing the composition of claim 1 and curing the same with moisture.

* * * * *